Figure 1:
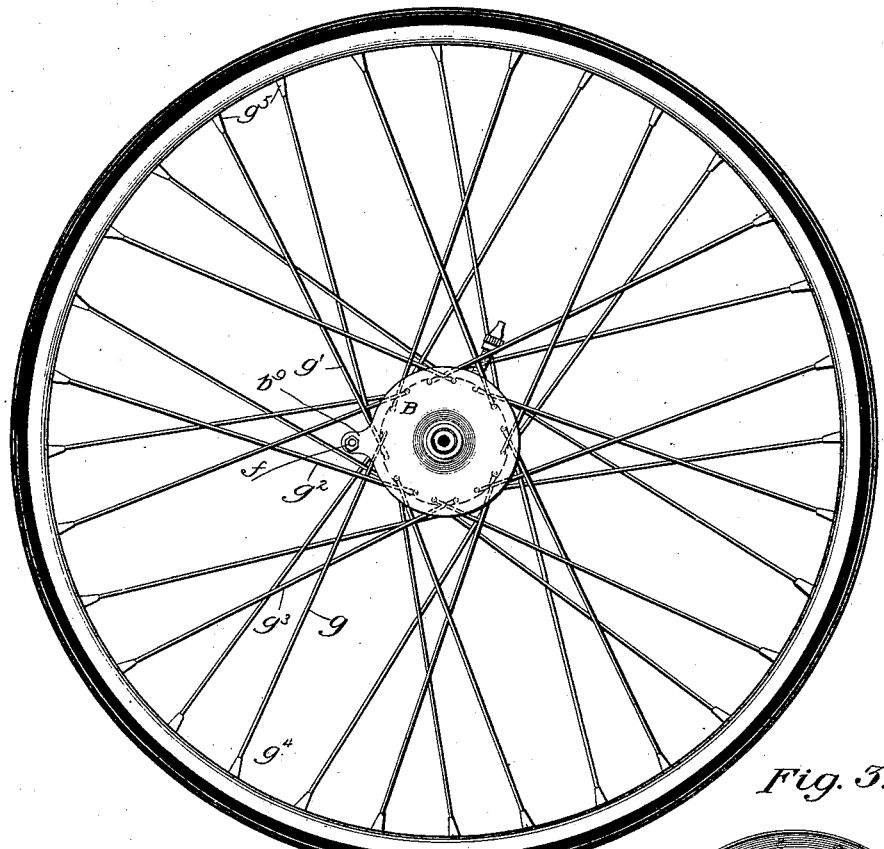

(No Model.)

3 Sheets—Sheet 1.

H. R. COLLINS.
VEHICLE WHEEL.

No. 594,604.

Patented Nov. 30, 1897.

WITNESSES

INVENTOR
Harry R. Collins
By Julian C. Dowell
His Atty

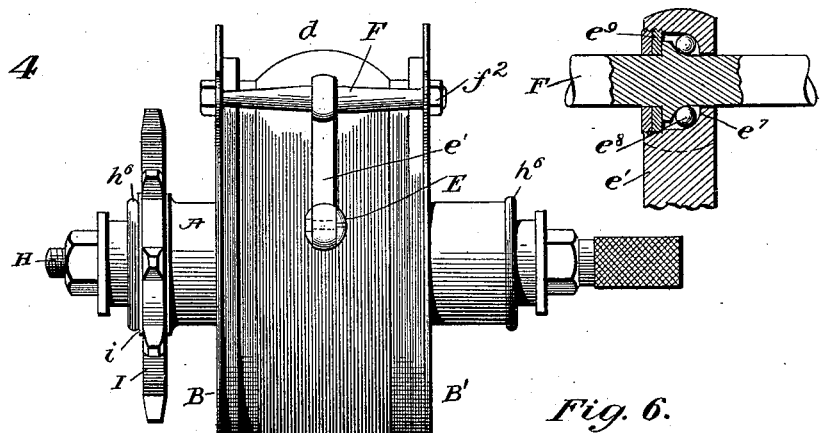

(No Model.)  3 Sheets—Sheet 3.

H. R. COLLINS.
VEHICLE WHEEL.

No. 594,604.  Patented Nov. 30, 1897.

WITNESSES
Edw. D. Duvall Jr.
Chas. E. Riordon

INVENTOR
Harry R. Collins
By Julian C. Dowell
His Attorney

THE NORRIS PETERS CO., PHOTO-LITHO., WASHINGTON, D. C.

UNITED STATES PATENT OFFICE.

HARRY R. COLLINS, OF SOUTH BETHLEHEM, PENNSYLVANIA.

VEHICLE-WHEEL.

SPECIFICATION forming part of Letters Patent No. 594,604, dated November 30, 1897.

Application filed June 23, 1897. Serial No. 641,958. (No model.)

*To all whom it may concern:*

Be it known that I, HARRY R. COLLINS, a citizen of the United States, residing at South Bethlehem, in the county of Northampton and State of Pennsylvania, have invented certain new and useful Improvements in Vehicle-Wheels; and I do hereby declare the following to be a full, clear, and exact description of the invention, such as will enable others skilled in the art to which it appertains to make and use the same.

My invention relates to vehicle-wheels, but more particularly to that class of wheels which are provided with a pneumatic tube at the hub to prevent jarring and jolting of the rider when passing over obstructions or uneven surfaces. Heretofore in the manufacture of this class of wheels the constructions employed have been such as to make the wheel unnecessarily heavy and therefore undesirable for use in bicycles, which is the more common use to which wheels constructed in this manner are applied.

The primary object of my invention is to provide a wheel of this class in which are combined all the advantages of simplicity in construction, lightness and strength, and durability in use without the serious disadvantages incident to the use of wheels of this class as heretofore constructed, as will be hereinafter more fully described.

A further object of my invention is to provide an unvarying leverage between the hub and spoke-rim, so as to enable the rider to exert an even strain upon the driving-chain at all points in the revolution of the wheel, which cannot be done in prior constructions, owing to the varying leverage, which is a universal fault in such prior constructions.

Other objects of my invention are to provide a special connection between the saddle-sections on the hub, whereby I avoid the liability of permitting the parts to become disengaged, and to provide a removable wearing-surface for the pneumatic tube between it and the saddle-sections, so as to prevent unnecessary abrasion and wear thereon, with consequent injury and burning, due to the friction between it and the saddle-sections, particularly in speeding, and, finally, to provide a special arrangement for securing the spokes to the spoke-ring, so as to prevent the spokes from working loose and puncturing the air tube or tubes, and to so arrange the spokes relatively to each other as to cause them to interlace, so that greater rigidity of the wheel can be obtained.

The invention will first be hereinafter more particularly described with reference to the accompanying drawings, which form a part of this specification, and then pointed out in the claims at the end of the description.

Figures 2, 3:
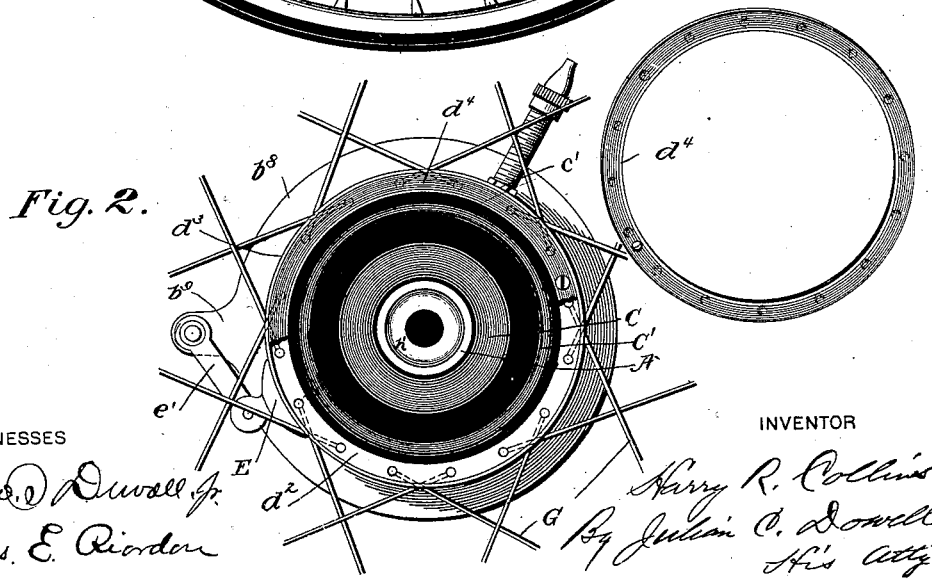
Figure 9:
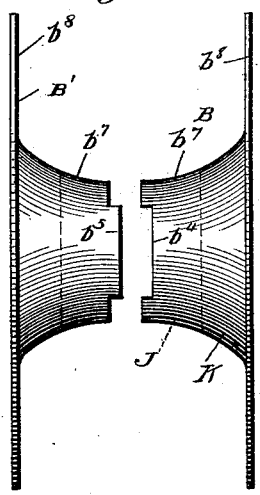
Figure 10:
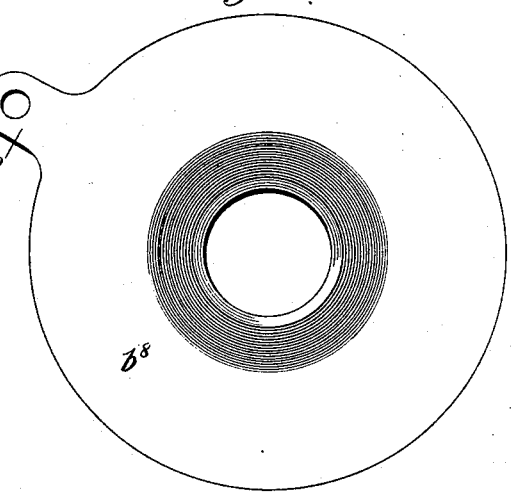
Figure 11:
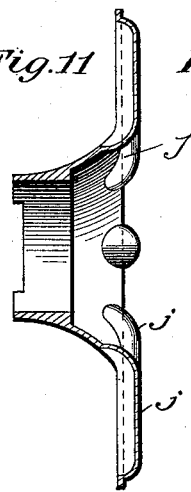
Figure 12:
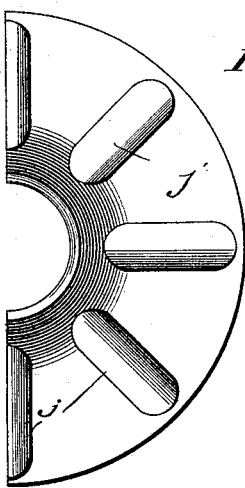
Figure 13:
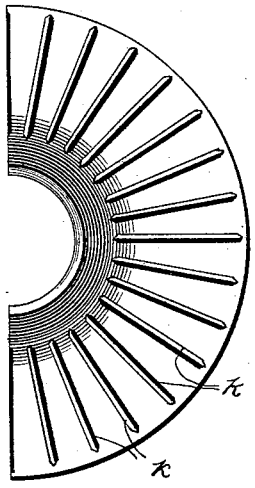
Figure 14:
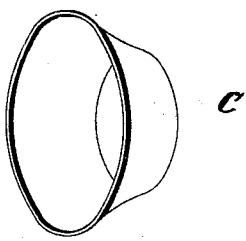

In the drawings, in which similar letters denote corresponding parts in different views, Figure 1 is a side elevation of a wheel constructed in accordance with my invention. Fig. 2 is a side elevation, on a larger scale, of the hub with the near saddle section or plate removed. Fig. 3 is a perspective view of one of the packing-rings interposed between the spoke-ring and the side plates of the saddle-sections. Fig. 4 is a front elevation of the hub. Fig. 5 is a vertical transverse section of the hub on an enlarged scale, showing the axle box or sleeve in elevation. Fig. 6 is a detail sectional view of one end of the axle-box and the ball-bearings. Figs. 7 and 8 are detail views of the ball-bearings employed at the ends of the pedestal-link. Fig. 9 is a front elevation of the saddle-sections disengaged from each other. Fig. 10 is an outer side elevation of one of the saddle-sections. Fig. 11 is a vertical cross-section of a modified form of saddle-section. Fig. 12 is an outer side elevation of the part shown in Fig. 11. Fig. 13 is an outer side elevation of a further modification of the saddle-sections, and Fig. 14 is a perspective view of one of the cone bearings or thimbles which fit over the seats of the saddle-sections.

A denotes the axle box or sleeve, provided on its exterior and near the middle thereof with the right-handed screw-thread $a$ and the left-handed screw-thread $a'$, separated by the intervening portion $a^2$. The sleeve is further provided, approximately centrally thereof, with the annular shoulder $a^3$, against which a shoulder $b$ of the saddle-section B abuts. The saddle which supports the pneumatic tube may consist of two similarly-formed sections B B', (see Fig. 9,) one of which, as B, is provided with an interior screw-thread which engages the screw-thread $a$, in order that it may be securely held on the axle-sleeve. The other section, as B', may have a smooth interior surface and be held in engagement with the section B by the collar $b^3$, fitting on the left-hand screw-thread $a'$. The adjacent edges of the two saddle-sections are preferably formed so that they interlock. This may be accomplished by having one section, B, formed with the diametrically-arranged openings $b^4$, in which fit the diametrically opposite projections $b^5$ on the other section, B'. These openings $b^4$ and projections $b^5$ are of different sizes, the advantage of which is that to interlock the sections the openings and corresponding projections must agree, and this is made impossible except when the parts are in proper position for the attachment of the saddle-sections to the bar. To enable the projections $b^5$ to easily engage in the openings $b^4$, the screw-thread on the axle-sleeve that is exposed by the openings in the saddle-sections is cut away, as indicated at $b^6$ in Fig. 5 of the drawings. This arrangement for holding the saddle-sections on the axle-sleeve and interlocking the ends of said sections prevents the sections from becoming loose by reason of the wheel being driven in opposite directions. Should the wheel be driven in the direction which would cause one saddle-section to tighten and the other section to loosen on the sleeve, the latter section would be prevented from becoming loose by reason of its being locked to the end of the other section.

Each of the saddle-sections B B' is formed with a curved seat $b^7$, terminating in a vertical annular flange $b^8$, which flanges form the sides of the pneumatic hub, and on the periphery of each flange may be formed or provided an apertured extension or lug $b^9$ for the purpose hereinafter stated. These extensions or lugs are in alinement when the saddle-sections are properly locked together. As will be seen by reference to Fig. 5 of the drawings, the curved seats $b^7$ of the saddle-sections are of a greater width than the diameter of the pneumatic tube, which allows the tube to expand freely and permit lateral projection thereof when compressed without coming into contact with the side flanges of the sections, thus preventing any wear which may be caused by frictional contact with said sides. At those points of the pneumatic tube which are supported by the seats of the saddle-sections are interposed the cone-bearings or thimbles C between the tube and the seats of the saddle-sections. These thimbles or auxiliary saddle-seats are preferably of the same contour as the seats of the saddle-sections, so as to fit snugly on the seats, and may be of such width that when they are in proper position and the two saddle-sections are locked together the vertical flanges $b^8$ will be in such close proximity to the edges of the thimbles as to prevent lateral shifting of the same. Said thimbles are, however, permitted to turn on the saddle-sections, thereby avoiding any wear on the tube which might be caused by their movement against the tube. By this construction any friction or wear on the tube caused by the movement of the axle-sleeve or the saddle-sections will be taken up by the interposed thimbles.

The pneumatic tube C' may be of rubber or any desired elastic material and be provided with any desired form of valve. The valve-tube is preferably exteriorly screw-threaded and made to fit in an opening provided for it in the spoke-ring D, and may be held in the spoke-ring by means of the nut $c'$, so that any movement of the tube in the ring is prevented. This is further prevented by the inflation of the tubes, which when inflated will fill the curved recess $d$, provided for it in the concavity of the spoke-ring, and will also bear tightly against the thimbles.

The spoke-ring D is formed with the curved recess or concavity $d$, the horizontal circular flange $d'$, and the vertical annular flange $d^2$, which latter terminates in the annular outwardly-extending flange or lip $d^3$, so that a pocket or recess will be formed in the side of the spoke-ring, in which suitable packing $d^4$ may be placed. This packing preferably consists of a ring of compressed fiber, which material is used on account of its toughness and to prevent wear of the two steel-surfaces in contact with each other, the said packing-ring having countersunk bores to receive the heads of the spokes. Wear at this point is further prevented by the use of graphite on the face of the packing, which excludes all dust, dirt, and dampness, owing to its natural qualities and adaptability to this purpose. The spokes E of the wheel are bent at the ends thereof which are connected to the spoke-ring by passing through apertures in the vertical flange $d^2$, and they are secured in said apertures by upsetting the ends, so as to form the heads $e''$, which fit in the countersunk bores in the packing-rings $d^4$. By thus securing the spokes to the ring all possibility of their becoming loose and being forced through the spoke-ring when the wheel strikes an obstruction, and thereby puncturing the pneumatic tube, is obviated.

The spoke-ring is held in position between the sides of the saddle-sections and confines the inflated tube, and motion is communicated to it by the following means: Brazed or otherwise secured to the spoke-ring is a pedestal E, which is bifurcated to receive one end $e$ of a pedestal-link $e'$, which is preferably provided with a ball-bearing therein. This bearing may consist of a ball-race $e^2$ in the pedestal-link and a cone $e^3$, fitting in the race and against interposed balls $e^4$, the cone being held in the race by the screw-threaded bolt $e^5$. The cone is adjustably held against the balls by its exterior screw-thread $e^6$, engaging a screw-thread on the standard. The other end of the link $e$ may also be provided with a ball-race $e^7$, and passing through the end of the link is a pull-bar F, having a conical or rounded bearing-surface $e^8$ thereon which bears against interposed balls in the across between said flanges and fastened in the same, a pneumatic tube encircling said hub between its side flanges, a spoke-ring encircling said tube and having an outwardly-projecting pedestal fastened to it, and a link pivotally mounted at one end on the pull-bar and pivotally connected at the other end with the pedestal, substantially as and for the purpose described.

4. In a wheel, the combination with the hub, of the concentric spoke-ring and the pneumatic tube interposed between the hub and spoke-ring, a pedestal carried by the spoke-ring, a pull-bar carried by the hub, a link connecting the pedestal and pull-bar, and ball-bearings at the ends of the link between the same and the pedestal and pull-bar, substantially as described.

5. In a wheel, the combination with the sleeve of the hub provided with centrally-disposed exterior right and left handed screw-threads and an annular collar at one terminus of one set of threads, of the annular saddle-sections, one of which is interiorly correspondingly screw-threaded and which have their adjacent ends constructed with interlocking portions, one of said sections abutting against said collar and engaging the right-hand screw-thread, while the other section is locked in engagement with the first-mentioned section, and a collar bearing against the latter section and engaging the left-hand screw-thread, substantially as described.

6. In a wheel, the combination with the hub having the axle-sleeve provided with right and left handed screw-threads thereon, of the saddle-sections placed on said hub and having recesses or cut-out portions in the engaging end of one section adapted to receive correspondingly-formed extensions or projections on the engaging end of the other section, the annular part of one saddle-section being interiorly screw-threaded and adapted to be screwed on said sleeve while the other section is smooth, and a screw-threaded collar for holding the latter section on the sleeve, substantially as described.

7. In a wheel, the combination with the hub, the saddle-sections carried by said hub, the spoke-ring, a pneumatic tube interposed between the spoke-ring and saddle-sections and annular auxiliary saddle seats or thimbles interposed between the seats of the saddle-sections and said tube, substantially as described.

8. In a wheel, the combination with the hub, the saddle-sections carried thereby, the spoke-ring, and the pneumatic tube interposed between the spoke-ring and saddle-sections, of the auxiliary saddle seats or thimbles carried by the seat portions of the saddle-sections and interposed between said sections and the pneumatic tube; said thimbles being adapted to be maintained stationary relatively to the tube when the saddle-sections are locked in position on the hub so as to prevent the tube from being worn by contact with the saddle-sections, substantially as described.

9. In a wheel, the combination with a hub having a saddle and a pneumatic tube thereon, of a spoke-ring provided with vertical annular flanges each having a series of apertures, spokes having their ends bent and fitted in said apertures, and packing-rings interposed between the said flanges of the spoke-ring and the sides of the saddle and engaging the ends of the spokes, substantially as described.

10. In a wheel, the combination with a hub having a saddle and a pneumatic tube thereon; of a spoke-ring provided with vertical annular flanges each having a series of apertures, spokes having their ends bent, fitted in said apertures, and upset, and packing-rings interposed between the said flanges of the spoke-ring and the sides of the saddle, and socketed for engagement with the upset ends of the spokes, substantially as described.

11. In a wheel, the combination with a hub having a saddle with side flanges, and a pneumatic tube on said saddle; of a spoke-ring provided with vertical annular flanges inside the said flanges of the saddle, and each having a series of apertures, and spokes extending on the inner sides of the flanges of the spoke-ring and having their ends bent outwardly and fitted in said apertures.

12. In a wheel, the combination with a hub having a sleeve provided with interior annularly-recessed ends, of a ball-race fitted into each end of the sleeve and having a shoulder adapted to engage the recess of the sleeve, and cones projecting into said ball-races, each having a flange bearing against the ends of the ball-race and sleeve with an annular lip taking over the latter.

13. In a wheel, the combination with a hub having a sleeve provided with interior annularly-recessed ends, of a ball-race fitted into each end of the sleeve, and having a shoulder adapted to engage the recess of the sleeve, cones projecting into said ball-races each having an exterior annular groove in its portion which projects into the ball-race, and a flange bearing against the ends of the ball-race and sleeve with an annular lip taking over the latter, and a packing-ring fitted in said groove and contacting with the interior surface of the ball-race, substantially as and for the purpose described.

14. In a wheel, a saddle on the hub composed of two annular sections with interlocking formations in their confronting edges, means for holding said sections interlocked, a pneumatic tube encircling the saddle, and a spoke-ring encircling the pneumatic tube.

15. In a wheel, the combination with the hub, the spoke-ring and the wheel-rim, of the tangential spokes secured at one end to the spoke-ring and at the other end to the wheel-rim; said spokes being interlaced by each spoke passing alternately over and under the several spokes intercepted in passing from race. The pull-bar is held in the link end by means of the collars $e^9$, which engage a screw-thread in that end of the link.

The ends of the pull-bar F are screw-threaded, and they fit in the apertured extensions or lugs $b^9$ and may be held by nuts $f^2$, so that when the saddle-sections are turned by the hub the spoke-ring will be carried with it. With this arrangement it will be seen that the radial movement of the hub and saddle sections will always be from a fixed center, so that an unvarying leverage between the hub and pedestal will be maintained. The advantage of such an arrangement will be readily understood. The weight of the rider will cause the hub and saddle sections to compress the pneumatic tube or tire, and they will move in most instances in a small arc, of which the pedestal is the center, and as this center is always fixed it will be seen that there is no possibility of the leverage changing. When the pedestal is in the vertical plane of the lugs on the saddle-sections, the movement of the axle-sleeve and spindle or axle will be in a radial direction, but this additional movement is taken up by the link connection between the pedestal and pull-bar.

The spokes G of the wheel (see Figs. 1 and 2) radiate from a larger center than in the wheels ordinarily used, thereby enabling a much stronger wheel to be made. The wheel is further strengthened by having the spokes G crossed so as to interlace them, as clearly shown in Figs. 1 and 2. This is done by passing each spoke over one side of the first spoke, which is intercepted between the hub and rim, and then under the next spoke opposite to that passed on the first intercepted spoke, and so on alternately throughout the series of spokes intercepted. This construction braces each spoke passed, thereby enabling each spoke to contribute in bracing a larger section of the wheel than heretofore. Thus the spoke $g$, by being interlaced, will support the spokes $g'$ $g^2$ $g^3$ and assist in supporting the section of the rim included in the arc $g^4$ $g^5$. It will be understood that the spokes can be interlaced for any number of times that is found desirable.

The method of journaling the ends of the axle or spindle H of the wheel is clearly shown in Fig. 6 of the drawings. The sleeve A is provided with an annular and interior recess forming a shoulder $h$ near each end, and the ball-race $h'$ is pressed into the sleeve so as to have a shoulder $h^2$ thereon fit in said recess and engage the shoulder $h$ on the sleeve, so as to prevent the ball-race from being pressed in too far. The cone $h^3$, which is formed with the usual bearing-face for the balls, is also provided with an annular groove $h^4$, in which a washer $h^5$, of any suitable material—such as felt, chamois, or the like—is fitted, and with the flange or lip $h^6$, which fits over the end of the sleeve. With this arrangement of the washer in the cone it will be seen that no matter how tightly or how far the cone is moved into the ball-race there will be no compression of the washer, but on the other hand it will always bear against the ball-race, thus effectually preventing any dust or dirt from entering the ball-race.

The sprocket-wheel I is interiorly screw-threaded and works on a right-handed screw-thread formed on the sleeve A, and it is held thereon by means of a collar $i$ working on a left-handed screw-thread formed on a reduced portion of the sleeve. The annular lip $h^6$ on the cone $h^3$ bears against the collar $i$, so as to assist in excluding dust and dirt from the ball-bearings.

The saddle-sections are formed, preferably, of sheet-steel, which is first rolled to the desired thinness and then pressed into shape. The portion J, Fig. 9, is preferably brazed to the portion K in order that a stronger construction may be obtained, in that the sheet-steel may be rolled to a very thin sheet and yet be strong and durable. Corrugations or raised portions $j$ may extend from near the periphery of the saddle-sections to a point where the sections commence to curve inwardly to form the seat for the thimbles, as shown in the modifications in Figs. 11 and 12. In Fig. 13 I have shown a further modification, in which I provide the ribs or corrugations $k$, which are arranged in a manner similar to that of the ribs or raised portions $j$. (Shown in Figs. 11 and 12.)

It will be understood, of course, that various modifications may be made in the details of construction without departing from the spirit of my invention and that certain parts herein specifically described may be replaced by other parts which are old in the art and differently constructed, but adapted to be used in connection with such parts herein described as are of the substance of the invention, and hence I do not desire to be restricted to the use of the exact construction and combination of parts described and shown.

Having thus fully described my invention, what I claim as new, and desire to secure by Letters Patent of the United States, is—

1. In a wheel, the combination of a hub, a pneumatic tube encircling the same, a spoke-ring encircling the said tube, and a radius bar or link pivotally connected at one end with the hub and at the other end with the spoke-ring, thus rotatively connecting these parts while permitting relative radial movement thereof without a change of leverage in the connections between them, substantially as described.

2. In a wheel, the combination of a hub having side flanges, a pneumatic tube encircling the hub between its side flanges, a spoke-ring encircling said tube, and a radius bar or link pivotally connected at one end with the side flanges of the hub and at the other end with the spoke-ring, substantially as and for the purpose described.

3. In a wheel, the combination of a hub having side flanges and a pull-bar extending the spoke-ring to the rim, substantially as described.

16. In a wheel, the combination with the hub, of the saddle-sections having annular seat portions together affording a bearing for a pneumatic tube, and vertically-disposed outer flanges, said sections formed from sheet-steel pressed into the required shape, and having interlocking formations in their confronting edges, substantially as described.

17. In combination with the wheel-hub, the saddle-sections adapted to afford a bearing for a pneumatic tube; said sections being formed from sheet-steel pressed into the required shape and provided with strengthening ribs or corrugations, substantially as described.

18. In a wheel, the combination with the hub, of the saddle-sections carried thereby, said sections being formed from sheet-steel having strengthening ribs or corrugations stamped therein, substantially as described.

19. In a wheel, the combination with the hub and spoke-ring radially movable relatively to each other, of an interposed cushion, and a bearing for the latter between the same and the hub and rotatively movable with respect to the latter, whereby wear of the cushion is obviated, substantially as described.

In testimony whereof I affix my signature in presence of two witnesses.

HARRY R. COLLINS.

Witnesses:
   CHAS. E. RIORDON,
   S. B. ARMAT.